(12) United States Patent
Yanagisawa et al.

(10) Patent No.: US 8,398,245 B2
(45) Date of Patent: Mar. 19, 2013

(54) HEAT EXCHANGER AND PROJECTOR

(75) Inventors: Yoshiyuki Yanagisawa, Matsumoto (JP); Yasunaga Momose, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 351 days.

(21) Appl. No.: 12/751,181

(22) Filed: Mar. 31, 2010

(65) Prior Publication Data

US 2010/0253923 A1 Oct. 7, 2010

(30) Foreign Application Priority Data

Apr. 3, 2009 (JP) ................................ 2009-090845

(51) Int. Cl.
| | |
|---|---|
| G03B 21/26 | (2006.01) |
| G03B 21/14 | (2006.01) |
| F28F 7/00 | (2006.01) |
| F28F 3/12 | (2006.01) |
| F28F 1/42 | (2006.01) |
| F28D 15/00 | (2006.01) |

(52) U.S. Cl. ............ 353/54; 353/119; 165/83; 165/169; 165/80.4; 165/80.5; 165/104.22; 165/179

(58) Field of Classification Search ............... 353/54, 353/52, 119; 165/83, 168, 169, 80.4, 80.5, 165/104.19, 104.22, 179
See application file for complete search history.

(56) References Cited

U.S. PATENT DOCUMENTS

| | | | |
|---|---|---|---|
| 7,226,171 B2 * | 6/2007 | Fujimori et al. | ............... 353/52 |
| 7,556,383 B2 | 7/2009 | Utsunomiya | |
| 2004/0250994 A1 * | 12/2004 | Chordia | ..................... 165/80.4 |
| 2007/0068653 A1 | 3/2007 | Kondou et al. | |
| 2007/0084585 A1 | 4/2007 | Takagi et al. | |
| 2007/0103647 A1 * | 5/2007 | Egawa et al. | .................. 353/54 |
| 2010/0171935 A1 | 7/2010 | Yamagishi et al. | |

FOREIGN PATENT DOCUMENTS

| | | |
|---|---|---|
| CN | 1946278 A | 4/2007 |
| JP | 2006-259282 A | 9/2006 |
| JP | 2006-343498 A | 12/2006 |
| JP | 2007-103748 A | 4/2007 |
| JP | 2007-127398 A | 5/2007 |
| JP | 2007-264590 A | 10/2007 |
| WO | WO-2009-008166 A | 1/2009 |

\* cited by examiner

*Primary Examiner* — Georgia Y Epps
*Assistant Examiner* — Magda Cruz
(74) *Attorney, Agent, or Firm* — AdvantEdge Law Group, LLC

(57) ABSTRACT

A heat exchanger which is hollow and contains a plurality of small flow paths includes: a plurality of partition walls disposed in parallel with one another in the width direction of the heat exchanger to form the plural small flow paths; and an inlet unit and an outlet unit configured to communicate with the inside and the outside of the heat exchanger, and allow cooling liquid to flow into and out of the heat exchanger through the inlet unit and the outlet unit, the inlet unit and the outlet unit extend in directions opposite to each other along the width direction from a pair of center positions located approximately at the centers of inner side surfaces of the heat exchanger in the width direction and opposed to each other, and penetrate outer side surfaces of the heat exchanger.

10 Claims, 11 Drawing Sheets

HEAT EXCHANGER AND PROJECTOR

BACKGROUND

1. Technical Field

The present invention relates to a heat exchanger which exchanges heat with cooling liquid, and a projector including the heat exchanger.

2. Related Art

Currently, such a projector is known which includes a circulation type liquid-cooling device for circulating cooling liquid along a flow path and cooling a cooling target such as a liquid crystal panel by the circulated cooling liquid so as to efficiently cool the cooling target.

According to this type of liquid-cooling device, a heat exchanger capable of lowering the temperature of the cooling liquid is often used to effectively cool the cooling target by the cooling liquid (for example, see JP-A-2006-259282).

More specifically, the heat exchanger disclosed in JP-A-2006-259282 has a hollow rectangular parallelepiped shape, and an inlet unit and an outlet unit through which cooling liquid flows in and out is formed on one side surface of the rectangular parallelepiped shape, respectively. The heat exchanger further contains channels along which the cooling liquid flows. The heat exchanger having this structure provides heat exchange between the cooling liquid and partition walls constituting the channels and lowers the temperature of the cooling liquid while the cooling liquid introduced into the heat exchanger is flowing along the channels.

According to the liquid-cooling device described above, bubbles are generated in the flow paths by evaporation of the cooling liquid after the use of the cooling liquid for years. These bubbles flow into the heat exchanger with the cooling liquid and accumulate therein. When almost the entire part of the interior of the heat exchanger is filled with the bubbles, the heat exchange efficiency between the cooling liquid and the heat exchanger decreases by the function of the bubbles as a heat insulation layer. In this case, the temperature of the cooling liquid is difficult to be lowered.

The heat exchanger shown in JP-A-2006-259282 is designed on the assumption that images are projected from a projector installed in a position recognized as the normal position which allows images to be projected substantially in the horizontal direction (position of the projector placed on an installation surface such as a desk). In other words, the heat exchanger is so designed as to prevent such a condition that almost the entire part of the interior of the heat exchanger is filled with bubbles when the projector is placed in the normal position.

However, when the projector is placed in an upward projection position for projecting images upward (that is, a projection lens is disposed on the upper side) or in a downward projection position for projecting images downward (that is, the projection lens is disposed on the lower side), there is still a possibility that bubbles spread over almost the entire part of the interior of the heat exchanger.

More specifically, according to the heat exchanger disclosed in JP-A-2006-259282, each of the one side surface of the rectangular parallelepiped shape having the inlet unit and the one side surface of the rectangular parallelepiped shape having the outlet unit crosses the projection direction substantially at right angles, and the inlet unit and the outlet unit are disposed in parallel with the projection direction. Thus, when the projector is placed in the upward projection position or the downward projection position, there is a possibility that the inlet unit of the heat exchanger comes to the upper side. In this case, the outlet unit lies on the lower side.

When the heat exchanger is positioned in this condition, the bubbles having entered the interior of the heat exchanger with the cooling liquid move toward the upper space in the interior of the heat exchanger. These bubbles sequentially accumulate from the upper area toward the outlet unit formed in the lower area. Finally, the bubbles spread over almost the entire part of the interior of the heat exchanger.

Therefore, such a technology has been demanded which can maintain stable heat exchange efficiency between cooling liquid and the heat exchanger while preventing spread of bubbles over almost the entire part of the interior of the heat exchanger disposed in any positions.

SUMMARY

It is an advantage of some aspects of the invention to provide a heat exchanger and a projector which can maintain stable heat exchange efficiency between cooling liquid and the heat exchanger while preventing spread of bubbles over almost the entire part of the interior of the heat exchanger disposed in any positions.

A heat exchanger which is hollow and contains a plurality of small flow paths according to a first aspect of the invention includes: a plurality of partition walls disposed in parallel with one another in the width direction of the heat exchanger to form the plural small flow paths; and an inlet unit and an outlet unit configured to communicate with the inside and the outside of the heat exchanger, and allow cooling liquid to flow into and out of the heat exchanger through the inlet unit and the outlet unit. The inlet unit and the outlet unit extend in directions opposite to each other along the width direction from a pair of center positions located approximately at the centers of inner side surfaces of the heat exchanger in the width direction and opposed to each other, and penetrate outer side surfaces of the heat exchanger.

According to this aspect of the invention, the outlet unit of the heat exchanger extends in the width direction from the first center position located approximately at the center of the inner side surface of the heat exchanger in the width direction on the downstream side, and penetrates the outer side surface of the heat exchanger. On the other hand, the inlet unit of the heat exchanger extends along the width in the direction opposite to the extension direction of the outlet unit from the second center position opposed to the first center position on the upstream side, and penetrates the outer side surface of the heat exchanger.

Thus, in case of the heat exchanger included in the projector, for example, spread of bubbles over almost the entire part of the interior of the heat exchanger can be prevented as explained below even when the projector is installed in various positions.

For example, the heat exchanger is disposed within the external housing such that the outlet unit is positioned on the top surface side of the external housing, and that the inlet unit is positioned on the bottom surface side of the external housing, allowing cooling liquid to flow into and out of the heat exchanger in a direction substantially parallel with the projection direction (hereinafter referred to as a first disposition condition).

In case of the first disposition condition of the heat exchanger, the outlet unit (the first center position) is located in the upper area when the projector is installed in the normal position. In this case, the inlet unit (the second center position) is located in the lower area.

Thus, bubbles having entered the inside of the heat exchanger through the inlet unit shift upward by buoyancy, and are discharged with the cooling liquid through the outlet unit positioned on the upper side to the outside.

When the projector is installed in the upward projection position or the downward projection position, the first center position and the second center position of the heat exchanger are located approximately at the center positions in the up-down direction.

In this case, bubbles having entered the inside of the heat exchanger through the inlet unit shift upward by buoyancy, and sequentially accumulate in the upper space inside the heat exchanger. Then, the bubbles accumulated up to the position of the outlet unit (the first center position) are discharged with the cooling liquid through the outlet unit to the outside.

Thus, even when the projector is installed in various positions, bubbles accumulate only in the area up to approximately the half of the inside of the heat exchanger at the most. As a result, spread of the bubbles over the substantially entire area of the interior of the heat exchanger is prevented.

Accordingly, even when the projector is installed in various positions, stable heat exchange efficiency between the cooling liquid and the heat exchanger is maintained. Thus, the temperature of the cooling liquid can be efficiently lowered, and the cooling target to be cooled by the cooling liquid can be effectively cooled.

A projector according to a second aspect of the invention includes: a liquid-cooling device which cools a cooling target by cooling liquid; and an external housing which forms an external case. The liquid-cooling device includes the heat exchanger described above. The heat exchanger is disposed within the external housing such that the outlet unit is positioned on the top surface side of the external housing, and that the inlet unit is positioned on the bottom surface side of the external housing, allowing cooling liquid to flow into and out of the heat exchanger in a direction substantially parallel with the projection direction of images from the projector.

The projector according to this aspect of the invention includes the heat exchanger described above, and the heat exchanger is disposed in the first disposition condition. Thus, operations and advantages similar to those of the heat exchanger described above can be provided.

A projector according to a third aspect of the invention includes: a liquid-cooling device configured to cool a cooling target by cooling liquid; and an external housing which forms an external case. The liquid-cooling device includes the heat exchanger described above, and the heat exchanger is disposed within the external housing such that the heights of the inlet unit and the outlet unit from the bottom surface of the external housing become substantially equal, allowing cooling liquid to flow into and out of the heat exchanger in a direction substantially parallel with the projection direction of images from the projector.

According to this aspect of the invention, the heat exchanger is disposed within the external housing in the manner described above (hereinafter referred to as a second disposition condition).

In case of the second disposition condition of the heat exchanger, the thickness direction orthogonal to both the width direction and the extension direction of the partitioning walls corresponds to the up-down direction when the projector is installed in the normal position.

Generally, the width of the heat exchanger is smaller than the respective lengths of the heat exchanger in the width direction and the extension direction of the partitioning walls.

Thus, when the projector is installed in the normal position, the clearance between the space inside the heat exchanger and a hole of the outlet unit in the up-down direction is extremely small.

Thus, even when bubbles flowing into the inside of the heat exchanger through the inlet unit shift upward by buoyancy and sequentially accumulate in the upper space inside the heat exchanger, these bubbles accumulate only in the space of the extremely small clearance discussed above. Then, the bubbles having reached the periphery of the hole of the outlet unit are discharged with the cooling liquid through the outlet unit to the outside.

When the projector is installed in the upward projection position or the downward projection position, the heat exchanger is positioned in the same condition as the first disposition condition.

Accordingly, operations and advantages similar to those of the heat exchanger described above can be offered.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention is hereinafter described with reference to the drawings.

Structure of Projector

Figure 1:
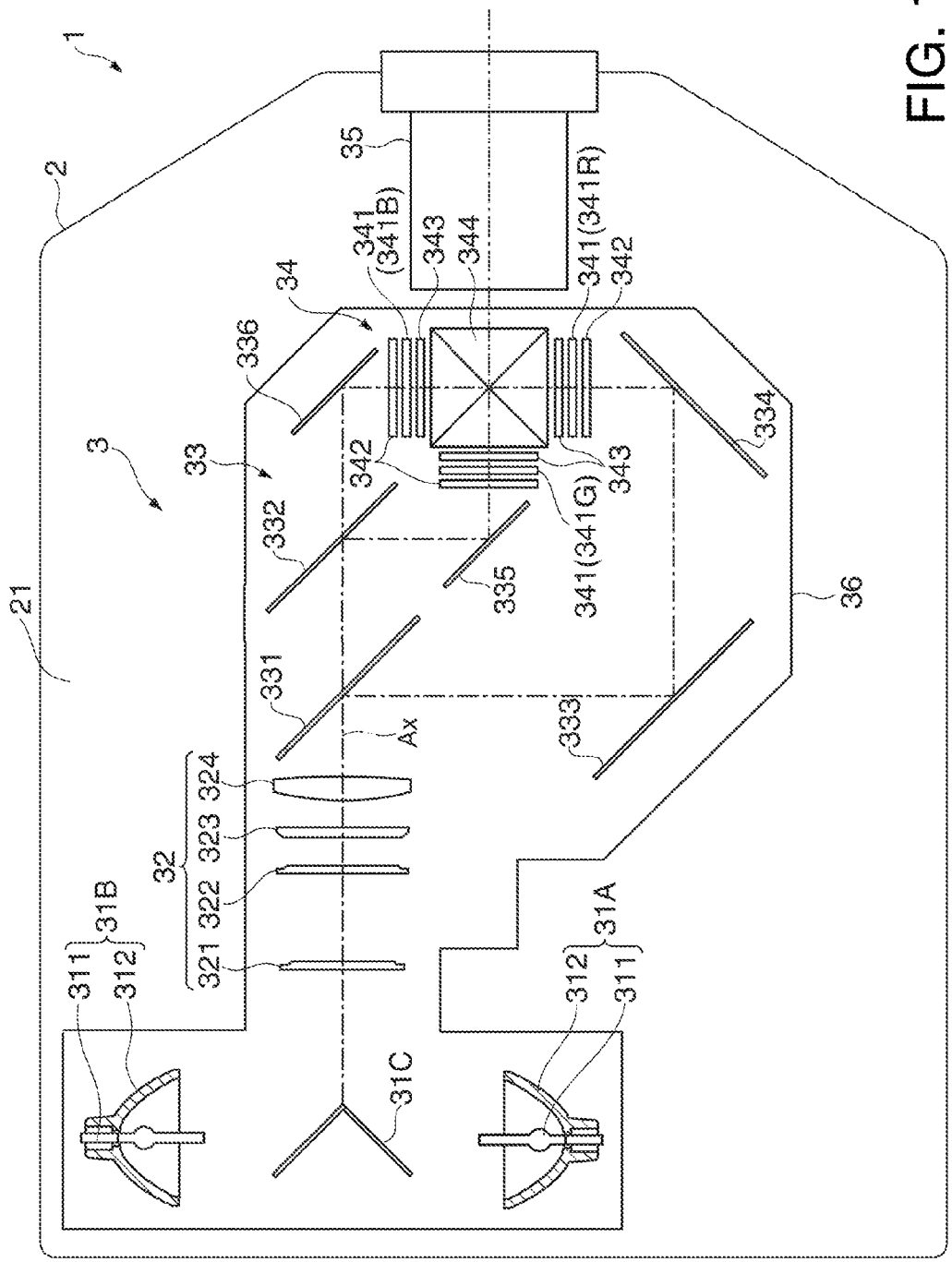
FIG. 1 illustrates the general structure of a projector according to a first embodiment.

FIG. 1 illustrates the general structure of a projector 1 according to the first embodiment. More specifically, FIG. 1 illustrates the interior structure of the projector 1 as viewed from a top surface 21 (see FIGS. 8A through 8C) of an external housing 2.

The projector 1 forms images corresponding to image information and projects the formed images on a screen (not shown) to display projection images. As illustrated in FIG. 1, the projector 1 includes the external housing 2 constituting an external case, an optical unit 3, a liquid-cooling device 4 (see FIG. 2), and others.

The external housing 2 has a substantially rectangular parallelepiped shape which has the top surface 21 (see FIGS. 8A through 8C) and a bottom surface 22 (see FIGS. 8A through 8C) crossing the vertical direction when the projector 1 is placed in the normal position. The external housing 2 accommodates the optical unit 3 and the liquid-cooling device 4.

A pair of handles 21A (see FIGS. 8A through 8C) are attached to the top surface 21 of the external housing 2.

The pair of the handles 21A are substantially U-shaped components held by a user while the projector 1 is being carried or on other occasions. Both ends of each U shape of the handles 21A are attached to the top surface 21 such that the pair of the handles 21A are disposed in parallel with each other and expanded in the front-rear direction (the direction corresponding to the projection direction of images from a projection lens 35).

Though not specifically shown, each of the pair of the handles 21A has a plurality of screw holes to which suspension fittings are attached when the projector 1 is installed in the suspension position (that is, when the projector is suspended from the ceiling or the like).

Thus, the projector 1 according to this embodiment is designed such that the position of the projector 1 becomes the same position as the normal position (that is, the top surface 21 is positioned upward and the bottom surface 22 is positioned downward) when the projector 1 is installed in the suspension position.

Structure of Optical Unit

The optical unit 3 forms images in accordance with image information and projects the formed images under the control of a controller (not shown).

As illustrated in FIG. 1, the optical unit 3 includes: a pair of light source devices 31A and 31B; a reflection mirror 31C; an illumination device 32 which has lens arrays 321 and 322, a polarization converting element 323, and a stacking lens 324; a color separation device 33 which has dichroic mirrors 331 and 332, and reflection mirrors 333 through 336; an optical device 34 which has three liquid crystal panels 341 (a red light liquid crystal panel 341R, a green light liquid crystal panel 341G, and a blue light liquid crystal panel 341B) as a light modulating element, three entrance side polarization plates 342, three exit side polarization plates 343, and a cross dichroic prism 344 as a color combining device; the projection lens 35 as a projection device; and an optical component housing 36 for accommodating the respective units 31A, 31B, and 32 through 34.

As illustrated in FIG. 1, each of the light source devices 31A and 31B has the same structure which includes a light source lamp 311 and a reflector 312. The pair of the light source devices 31A and 31B are disposed opposed to each other with the reflection mirror 31C positioned between the light source devices 31A and 31B in such positions that lights can be emitted from the light source devices 31A and 31B toward the reflection mirror 31C.

According to the optical unit 3 having this structure, lights emitted from the pair of the light source devices 31A and 31B are reflected by the reflection mirror 31C in a direction along an illumination axis Ax (FIG. 1) established inside the optical component housing 36 to be supplied to the illumination device 32. After the in-plane illuminance of the lights supplied to the illumination device 32 is equalized by the illumination device 32, the lights are divided into three color lights in R, G, and B by the color separation device 33. Each of the separated color lights is modulated by the liquid crystal panels 341 for the respective colors according to the image information to form images corresponding to the respective color lights. The images of the respective color lights are combined by the prism 344 and projected on the screen (not shown) through the projection lens 35.

Structure of Liquid-Cooling Device

Figure 2:
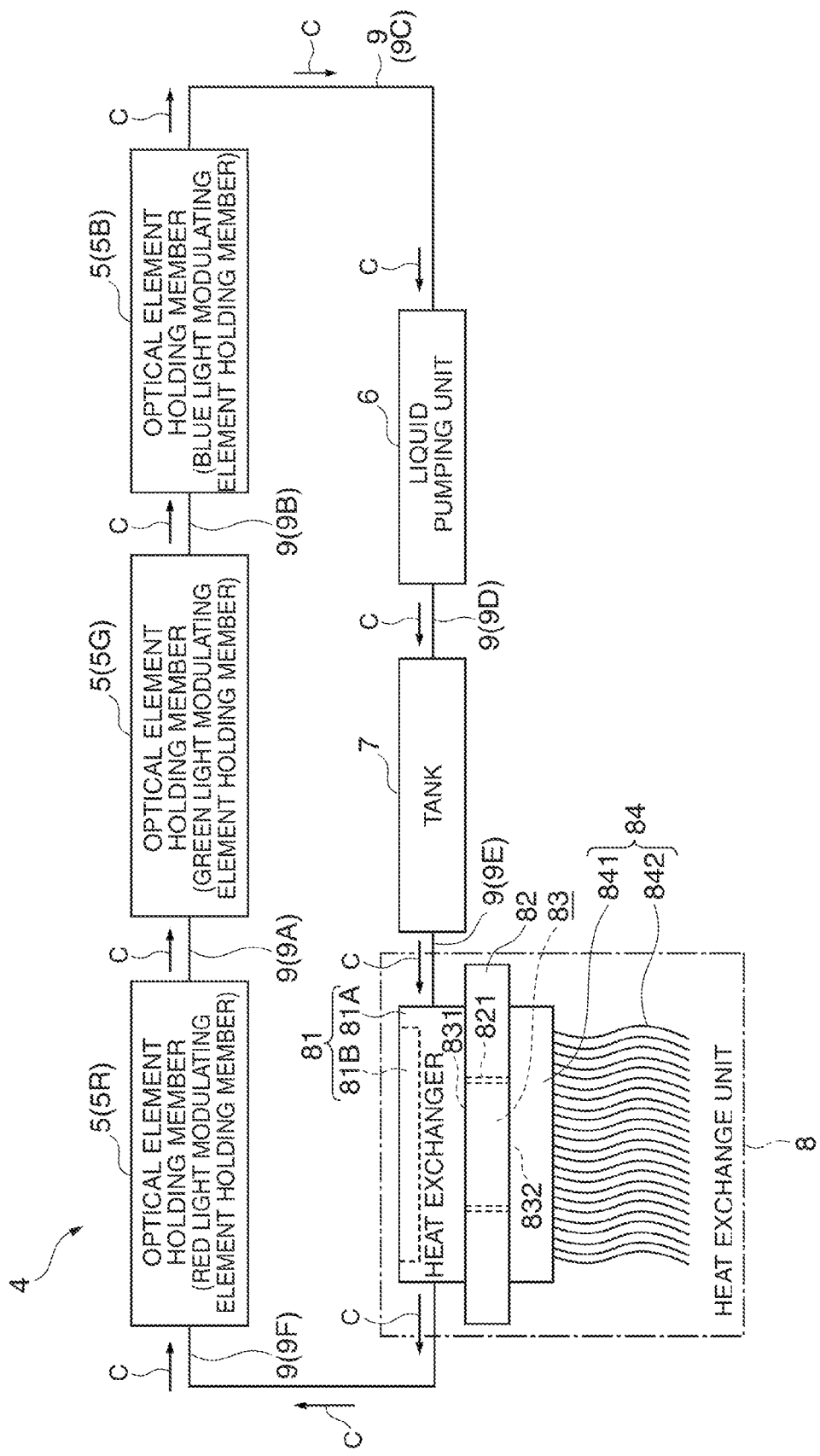
FIG. 2 schematically shows the structure of a liquid-cooling device according to the first embodiment.

FIG. 2 schematically shows the structure of the liquid-cooling device 4.

The liquid-cooling device 4 circulates cooling liquid such as water and ethylene glycol along an annular flow path to cool the liquid crystal panels 341 as the optical elements by the cooling liquid. As illustrated in FIG. 2, the liquid-cooling device 4 includes three optical element holding members 5, a liquid pumping unit 6, a tank 7 as a liquid storage unit, a heat exchange unit 8, and a plurality of liquid circulating members 9.

Each of the plural liquid circulating members 9 is constituted by a pipe-shaped component which allows the cooling liquid to flow through the inside of the pipe-shaped component. The liquid circulating members 9 connect the respective units 5 through 8 to form the annular flow path.

The structure of the liquid circulating members 9 for connecting the respective units 5 through 8 will be described later.

Structure of Optical Element Holding Member

Figure 3:
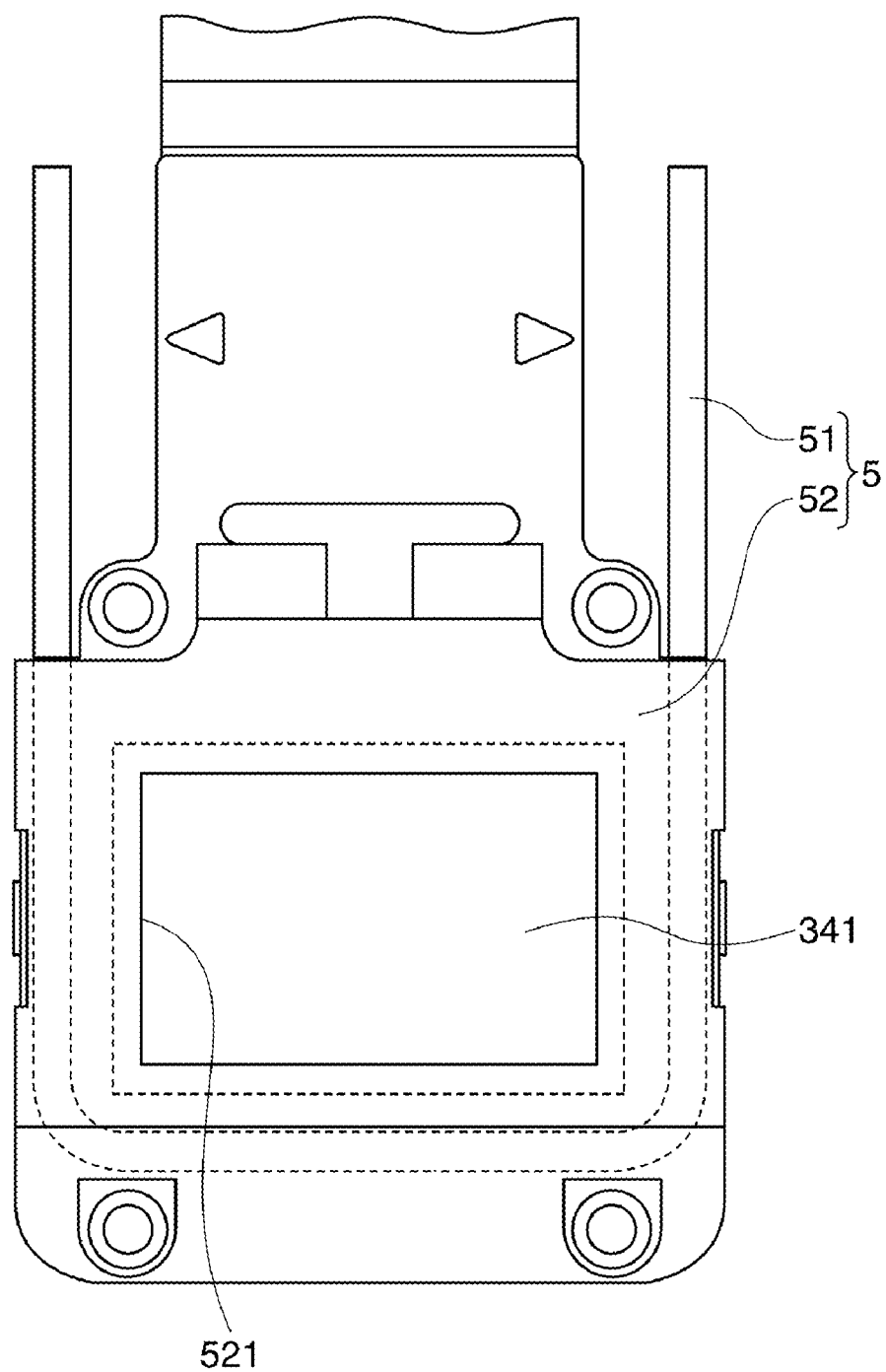
FIG. 3 illustrates the structure of an optical element holding member.

FIG. 3 illustrates the structure of one of the optical element holding members 5. More specifically, FIG. 3 is a plan view showing the optical element holding member as viewed from the light entrance side.

The three optical element holding members 5 hold the corresponding three liquid crystal panels 341, and cool the corresponding liquid crystal panels 341 by the cooling liquid flowing into and out of the insides of the optical element holding members 5. Each of the optical element holding members 5 has the same structure, and thus only one of the optical element holding members 5 is explained herein. As illustrated in FIG. 3, the optical element holding member 5 has a liquid flow pipe 51 and an optical element support frame 52.

The liquid flow pipe 51 is bent in such a manner as to surround an image forming area (light transmission area) of the liquid crystal panel 341 in the plan view, and the respective ends through which the cooling liquid flows in and out extend in parallel with the upper side (the top surface 21 side) of the liquid crystal panel 341.

Though not specifically shown in the figure, a concave portion concaved toward the light entrance side in correspondence with the external shape of the liquid crystal panel 341 is formed on the light exit side of the optical element support frame 52 to accommodate and hold the liquid crystal panel 341 by the concave portion.

As illustrated in FIG. 3, an opening 521 corresponding to the image forming area of the liquid crystal panel 341 is formed on the bottom area of the concave portion.

Though not specifically shown in the figure, a U-shaped through hole in the plan view penetrates the optical element support frame 52 in such a manner as to surround the concave portion, and the liquid flow pipe 51 is inserted into the through hole.

Also, though not specifically shown in the figure, the optical element support frame 52 is divided into two parts on the light entrance side and the light exit side such that the liquid flow pipe 51 can be sandwiched between the two parts.

The optical element holding member 5 having this structure is disposed in such a position that the liquid flow pipe 51 can be opposed to the side ends of the liquid crystal panel 341 to release heat of the liquid crystal panel 341 along a heat transmission path extending from the liquid crystal panel 341 through the optical element support frame 52 to the liquid flow pipe 51.

Structure of Liquid Pumping Unit

The liquid pumping unit 6 is a pump which sucks and delivers cooling liquid by compression to circulate the cooling liquid along the annular flow path.

The liquid pumping unit 6 has an impeller disposed within a hollow component, for example. In this case, the liquid pumping unit 6 sucks and delivers cooling liquid by rotation of the impeller.

The structure of the liquid pumping unit 6 is not limited to the structure provided with the impeller, but may be other structure having a diaphragm or the like.

Structure of Tank

Figure 4:
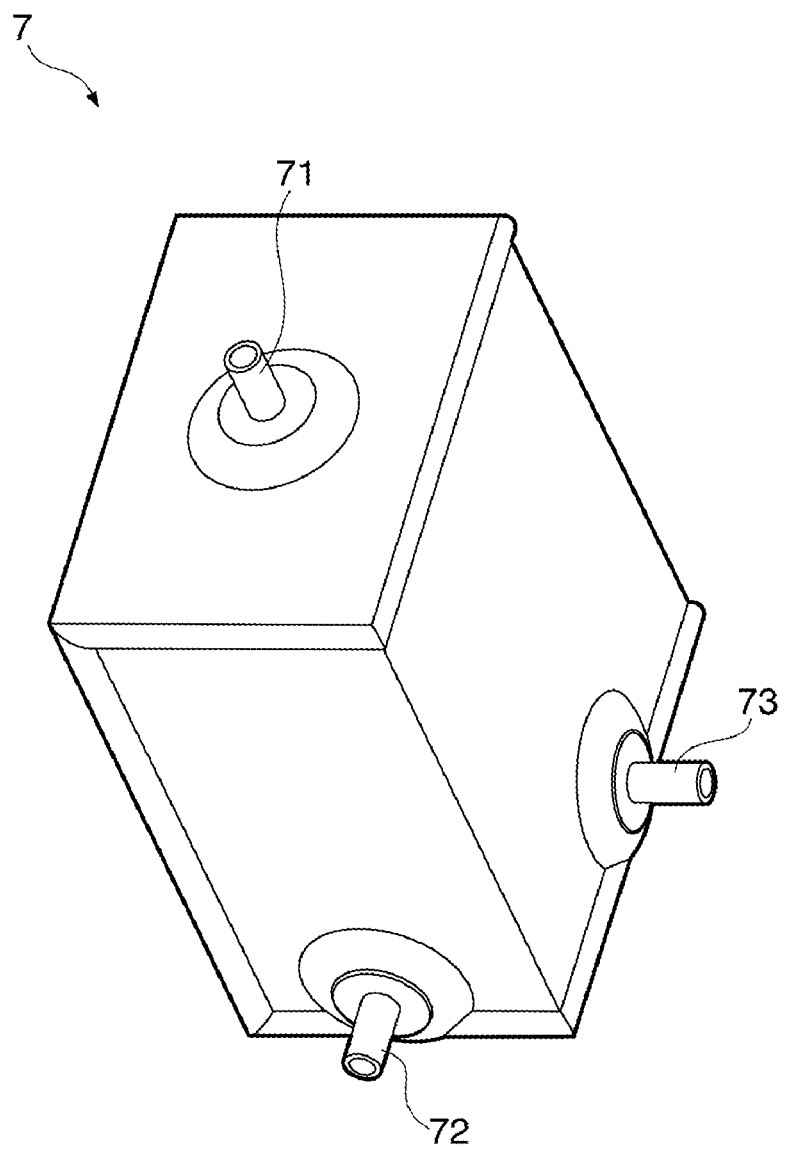
FIG. 4 is a perspective view showing the structure of a tank according to the first embodiment.

FIG. 4 is a perspective view illustrating the structure of the tank 7.

The tank 7 is a substantially rectangular parallelepiped hollow component which temporarily stores introduced cooling liquid and discharges the stored cooling liquid.

As illustrated in FIG. 4, a supply unit 71 is provided on the upper end surface of the tank 7. The supply unit 71 communicates with the inside of the tank 7 such that cooling liquid can be supplied into the tank 7 through the supply unit 71.

Thus, after the liquid-cooling device 4 is assembled, cooling liquid is supplied through the supply unit 71 to fill the liquid-cooling device 4 with cooling liquid.

Though not shown in FIG. 4, a cap for closing the supply unit 71 is attached to the supply unit 71 after cooling liquid is supplied into the tank 7.

Furthermore, as illustrated in FIG. 4, an inlet port 72 and an outlet port 73 are provided on one side surface and another side surface of the tank 7, respectively. The inlet port 72 and the outlet port 73 communicate with the inside of the tank 7 such that cooling liquid flows into and out of the tank 7 through the inlet port 72 and the outlet port 73.

The tank 7 having this structure is made of metal such as aluminum.

Structure of Heat Exchange Unit

The heat exchange unit 8 lowers the temperature of cooling liquid circulating along the annular flow path. As shown in FIG. 2, the heat exchange unit 8 includes a heat exchanger 81, a sectioning plate 82, a Peltier element 83 as a thermoelectric converting element, and a heat release side heat transfer unit 84.

Figure 5:
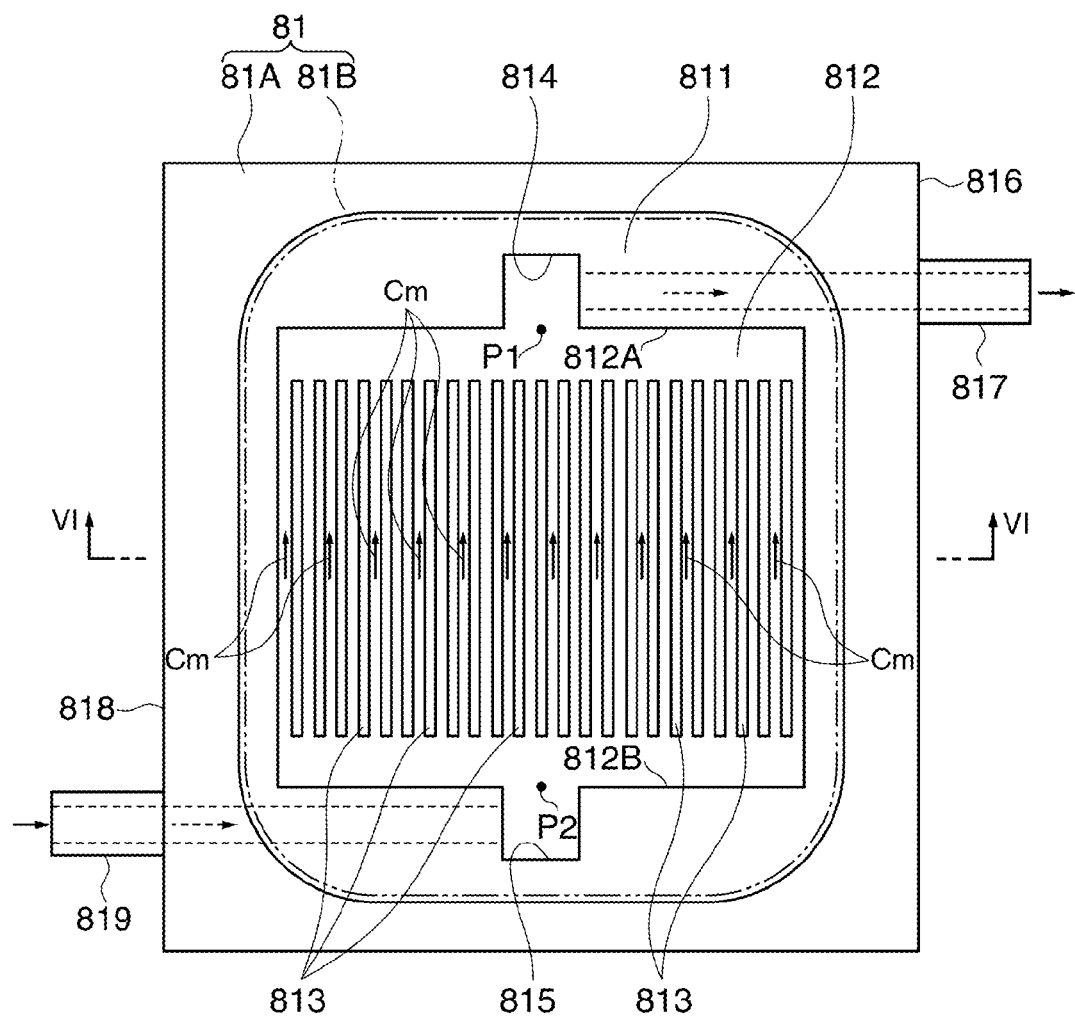
FIG. 5 illustrates the structure of a heat exchanger according to the first embodiment.
Figure 6:
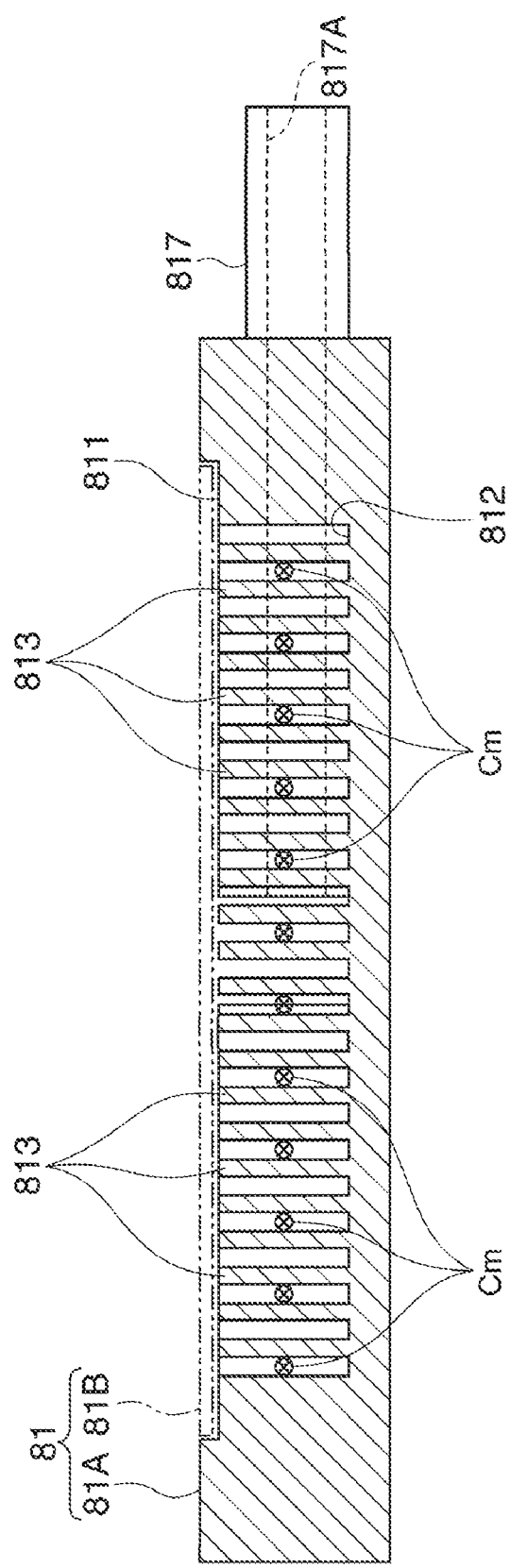
FIG. 6 illustrates the structure of the heat exchanger according to the first embodiment.

FIGS. 5 and 6 illustrate the structure of the heat exchanger 81. More specifically, FIG. 5 is a plan view of the heat exchanger 81, and FIG. 6 is a cross-sectional view taken along a line VI-VI in FIG. 5.

In the following explanation, a vertical axis (Y axis), and X axis and Z axis orthogonal to the Y axis shown in FIG. 5 are used for simplifying the explanation.

The heat exchanger 81 has a hollow shape and exchanges heat with cooling liquid flowing inside the heat exchanger 81. As illustrated in FIG. 5 or 6, the heat exchanger 81 includes an exchanger main body 81A and a shielding plate 81B.

As illustrated in FIG. 5 or 6, the exchanger main body 81A is a rectangular plate-shaped component.

The exchanger main body 81A has a first concave portion 811 having a concaved and substantially rectangular shape in the plan view on the plate surface in the +X axis direction.

Also, a second concave portion 812 having a concaved and rectangular shape in the plan view is formed on the bottom of the first concave portion 811.

A plurality of partitioning walls 813 extending in the Y axis direction and disposed in parallel with each other in the Z axis direction (the width direction of the heat exchanger 81) stand on the bottom of the second concave portion 812.

As illustrated in FIG. 6, each of the plural partitioning walls 813 has a height corresponding to the depth of the second concave portion 812. Also, each of the partitioning walls 813 has a thickness in the range from several tens μm to several hundreds μm, and is disposed with a clearance of a length in the range from several tens μm to several hundreds μm between one another.

As illustrated in FIG. 5, an exit side concave portion 814 concaved in the +Y direction is formed at a first center position P1 in the Z axis direction on a side wall (the inside surface of the heat exchanger 81) 812A of the second concave portion 812 on the +Y axis side.

Similarly, as illustrated in FIG. 5, an entrance side concave portion 815 concaved in the −Y direction is formed at a second center position P2 opposed to the first center position P1 on a side wall (the inside surface of the heat exchanger 81) 812B of the second concave portion 812 on the −Y axis side.

The exchanger main body 81A has an outlet unit 817 extending in the −Z axis direction from the side wall of the exit side concave portion 814 and penetrating an outer surface 816 on the −Z axis side (the outside surface of the heat exchanger 81). The outlet unit 817 further projects on the −Z axis side to connect the inside of the second concave portion 812 and the outside of the heat exchanger 81.

Similarly, the exchanger main body 81A has an inlet unit 819 extending in the +Z axis direction from the side wall of the entrance side concave portion 815 and penetrating an outer surface 818 on the +Z axis side (the outside surface of the heat exchanger 81). The inlet unit 819 further projects on the +Z axis side to connect the inside of the second concave portion 812 and the outside of the heat exchanger 81.

As indicated by a two-dot chain line in FIG. 5 or 6, the shielding plate 81B has a plate body having a shape similar to that of the first concave portion 811 in the plan view. The shielding plate 81B closes the second concave portion 812 by engaging with the first concave portion 811.

When the second concave portion 812 is closed by the shielding plate 81B, a plurality of small flow paths Cm are formed such that cooling liquid can flow between the plural partitioning walls 813 as illustrated in FIG. 5 or 6. Thus, the heat exchanger 81 is constituted by a so-called micro-channel heat exchanger or the like.

According to this structure, cooling liquid introduced into the heat exchanger 81 through the inlet unit 819 in the −Z axis direction as illustrated in FIG. 5 enters the inside of the second concave portion 812. Then, the cooling liquid flows through the plural small flow paths Cm from the −Y axis side to the +Y axis side, and flows in the −Z axis direction to the outside of the heat exchanger 81 through the outlet unit 817.

The sectioning plate 82 is a rectangular plate component in the plan view which separates the heat exchanger 81 from the heat release side heat transfer unit 84, and combines the heat exchanger 81, the Peltier element 83, and the heat release side heat transfer unit 84 as one unit. The sectioning plate 82 is made of material having low thermal conductivity (such as 0.9 W/(m·K) or lower).

As shown in FIG. 2, the sectioning plate 82 has a rectangular shape smaller than the shape of the heat exchanger 81 in the plan view, and has an opening 821 capable of engaging with the Peltier element 83.

The heat exchanger 81 is fixed to the periphery of the opening 821 on one side of the plate surfaces of the sectioning plate 82 in such a manner that the opening 821 can be closed by an approximately central area of the plate surface of the exchanger main body 81A on the −X axis side.

Though not specifically shown in the figures, the Peltier element 83 has a plurality of connection pairs each pair of which is formed by combining a p-type semiconductor and an n-type semiconductor by a metal piece. These plural connection pairs are electrically and directly connected with one another.

When electric power is supplied to the Peltier element 83 having this structure, one end surface of the Peltier element 83 becomes a heat absorbing surface 831 as shown in FIG. 2. In this case, the other end surface of the Peltier element 83 becomes a heat release surface 832.

Then, the Peltier element 83 engages with the opening 821 of the sectioning plate 82, and the heat absorbing surface 831 connects with the heat exchanger 81 (exchanger main body 81A) such that heat can be conducted thereto.

As illustrated in FIG. 2, the heat release side heat transfer unit 84 is constituted by a so-called heat sink having a rectangular plate body 841 and a plurality of fins 842 projecting from the plate body 841. The heat release side heat transfer unit 84 is fixed to the periphery of the opening 821 on the other side plate surface of the sectioning plate 82 in such a manner as to close the opening 821. In this condition, the heat release side heat transfer unit 84 connects with the heat release surface 832 of the Peltier element 83 such that heat can be conducted thereto.

That is, when the respective components 81, 83, and 84 are combined as one unit by the sectioning plate 82, the heat transmission path extending from the heat exchanger 81 through the Peltier element 83 to the heat release side heat transfer unit 84 is formed.

Thus, heat of the heat exchanger 81 is absorbed through the heat absorbing surface 831 and cooled by the operation of the Peltier element 83. The heat generated on the heat release surface 832 of the Peltier element 83 is released to the outside through the heat release side heat transfer unit 84.

Connection Structure Using Liquid Circulating Members

The connection structure for connecting the respective units 5 through 8 using the liquid circulating members 9 is now explained.

In the following explanation, the three optical element holding members 5 includes a red light modulating element holding member 5R for holding the red light liquid crystal panel 341R, a green light modulating element holding member 5G for holding the green light liquid crystal panel 341G, and a blue light modulating element holding member 5B for holding the blue light liquid crystal panel 341B as illustrated in FIG. 2 for simplifying the explanation.

As shown in FIG. 2, the liquid circulating members 9 are constituted by six members of first through sixth liquid circulating members 9A through 9F.

More specifically, the flow entrance side of the first liquid circulating member 9A is connected with one end of the liquid flow pipe 51 of the red light modulating element holding member 5R, and the flow exit side of the first liquid circulating member 9A is connected with one end of the liquid flow pipe 51 of the green light modulating element holding member 5G.

The flow entrance side of the second liquid circulating member 9B is connected with the other end of the liquid flow pipe 51 of the green light modulating element holding member 5G, and the flow exit side of the second liquid circulating member 9B is connected with one end of the liquid flow pipes 51 of the blue light modulating element holding member 5B.

The flow entrance side of the third liquid circulating member 9C is connected with the other end of the liquid flow pipe 51 of the blue light modulating element holding member 5B, and the flow exit side of the third liquid circulating member 9C is connected with the liquid pumping unit 6.

The flow entrance side of the fourth liquid circulating member 9D is connected with the liquid pumping unit 6, and the flow exit side of the fourth liquid circulating member 9D is connected with the inlet port 72 of the tank 7.

The flow entrance side of the fifth liquid circulating member 9E is connected with the outlet port 73 of the tank 7, and the flow exit side of the fifth liquid circulating member 9E is connected with the inlet unit 819 of the heat exchanger 81.

The flow entrance side of the sixth liquid circulating member 9F is connected with the outlet unit 817 of the heat exchanger 81, and the flow exit side of the sixth liquid circulating member 9F is connected with the other end of the liquid flow pipe 51 of the red light modulating element holding member 5R.

By the connection structure using the liquid circulating members 9 explained herein, an annular flow path C which passes the red light modulating element holding member 5R, the green light modulating element holding member 5G, the blue light modulating element holding member 5B, the liquid pumping unit 6, the tank 7, and the heat exchanger 81, and again returns to the red light modulating element holding member 5R is produced.

This structure allows the liquid-cooling device 4 to cool the liquid crystal panels 341 by the following method.

Initially, heat generated by the liquid crystal panels 341 is transmitted to the cooling liquid via the optical element holding members 5.

The cooling liquid flowing out of the optical element holding members 5 passes through the flow path C and enters the heat exchanger 81.

Before this step, the heat exchanger 81 has been cooled by the operation of the Peltier element 83 which absorbs heat through the heat absorbing surface 831. Thus, the heat exchanger 81 exchanges heat with the cooling liquid having entered the heat exchanger 81 while the cooling liquid is passing the small flow paths Cm provided inside the heat exchanger 81 so as to cool the cooling liquid.

Then, the cooling liquid cooled by the heat exchanger 81 again flows into the optical element holding members 5.

Position of Heat Exchanger

The respective positions of the heat exchanger 81 in accordance with various installation positions of the projector 1 are now explained.

The positional relationship between the heat exchanger 81 and the projection lens 35 is as follows.

Figure 7:
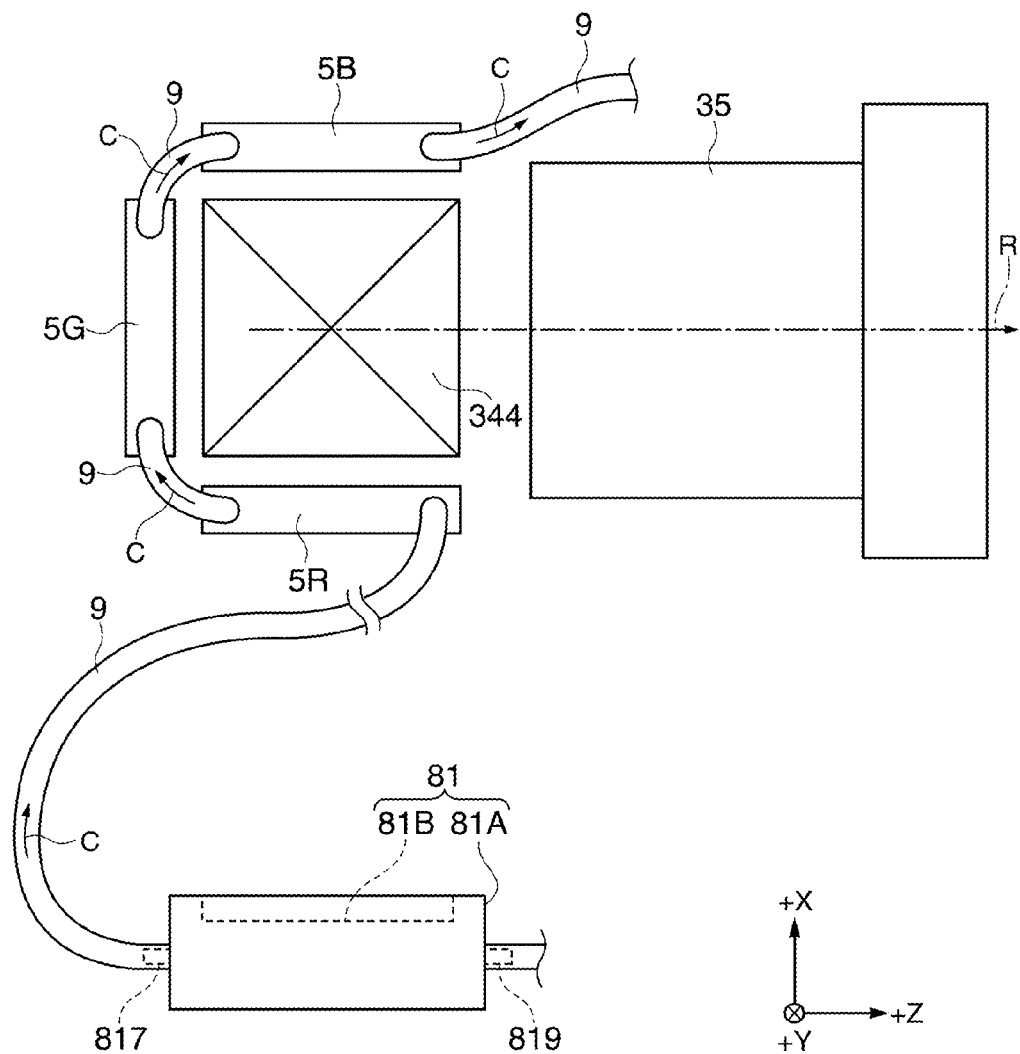
FIG. 7 schematically shows the positional relationship between a projection lens and the heat exchanger according to the first embodiment.

FIG. 7 schematically shows the positional relationship between the heat exchanger 81 and the projection lens 35. More specifically, FIG. 7 illustrates the heat exchanger 81 and the projection lens 35 as viewed from the top surface 21.

The heat exchanger 81 is provided within the external housing 2 in such a position that the +Y axis side of the heat exchanger 81 faces the top surface 21 and that the Z axis direction corresponds to a projection direction R of the projection lens 35.

More specifically, the outlet unit 817 is positioned on the top surface 21 side, and the inlet unit 819 is positioned on the bottom surface 22 side. In this condition, the cooling liquid flows into and out of the heat exchanger 81 provided inside the external housing 2 in a direction substantially parallel with the projection direction R.

The heat exchanger 81 disposed within the external housing 2 in the manner described above has the following positions when the projector 1 is installed in the respective positions.

Figure 8A:
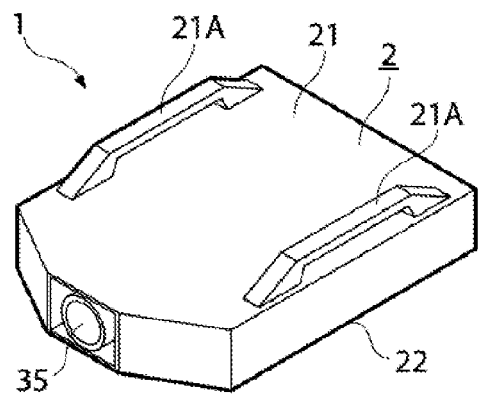
FIGS. 8A through 8C schematically illustrate various positions of the projector according to the first embodiment.
Figure 8B:
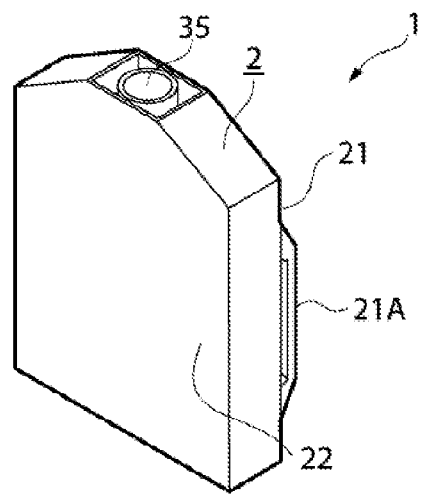
Figure 8C:
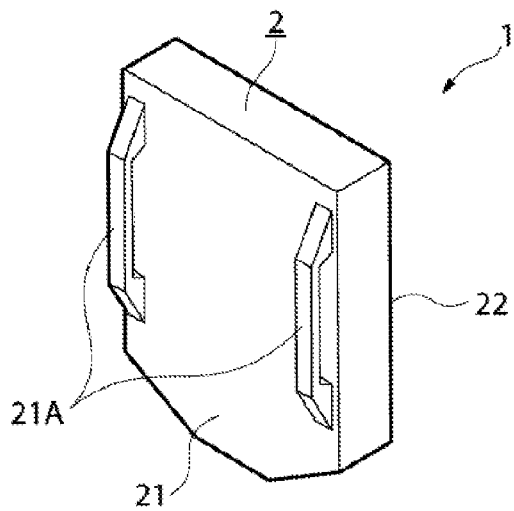

FIGS. 8A through 8C schematically illustrate the respective positions of the projector 1.

Figure 9A:
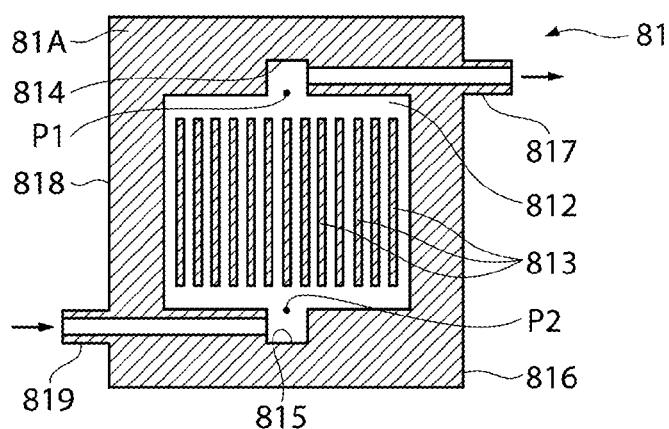
FIGS. 9A through 9C illustrate the positions of the heat exchanger corresponding to the various positions of the projector according to the first embodiment.
Figure 9B:
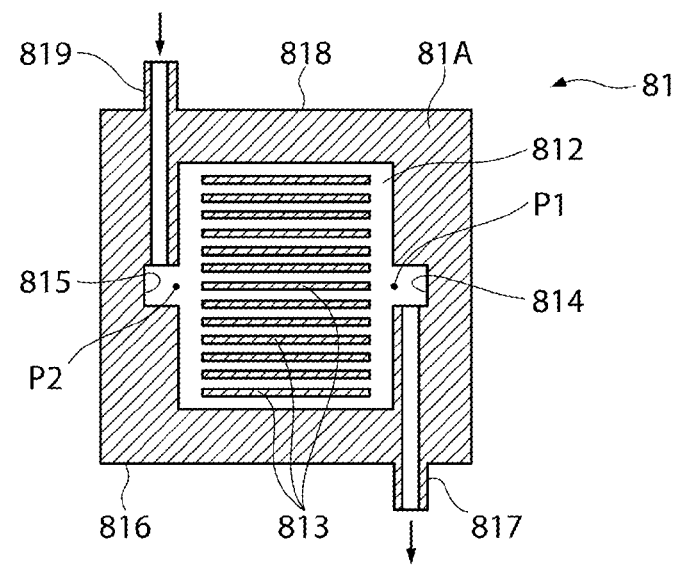
Figure 9C:
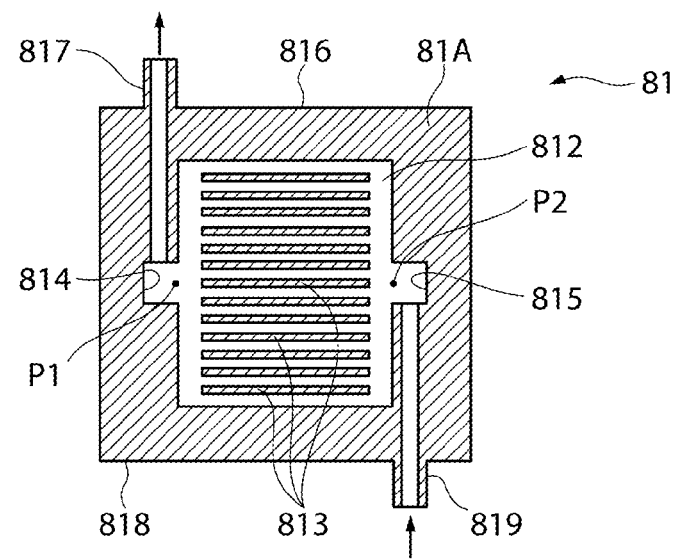

FIGS. 9A through 9C are cross-sectional views of the positions of the heat exchanger 81 in correspondence with the respective positions of the projector 1 as viewed from the shielding plate 81B.

When the projector 1 is installed in the normal position as shown in FIG. 8A (this position also applies to the suspension position), the outlet unit 817 (the exit side concave portion 814) is positioned in the upper area. In this case, the inlet unit 819 (the entrance side concave portion 815) is positioned in the lower area (FIG. 9A).

Thus, bubbles having entered the inside of the second concave portion 812 through the inlet unit 819 shift upward by buoyancy, and thus are discharged with the cooling liquid through the outlet unit 817 positioned in the upper area.

When the projector 1 is installed in the upward projection position (i.e., the projection lens 35 is positioned on the upper side) or in the downward projection position (i.e., the projection lens 35 is positioned on the lower side), the exit side concave portion 814 and the entrance side concave portion 815 are located substantially at the centers in the up-down direction as illustrated in FIG. 9B and FIG. 9C.

In this case, bubbles having entered the inside of the second concave portion 812 through the inlet unit 819 shift upward by buoyancy, and thus sequentially accumulate in the upper space within the second concave portion 812. Then, the bubbles having accumulated until the position of the exit side concave portion 814 are discharged with the cooling liquid from the outlet unit 817 to the outside.

According to the first embodiment, the following advantages are provided.

According to this embodiment, the outlet unit 817 and the inlet unit 819 included in the heat exchanger 81 extend from the center positions P1 and P2 of the side walls 812A and 812B in directions opposite to each other along the width direction of the heat exchanger 81, and penetrate the outer surfaces 816 and 818.

The heat exchanger 81 is disposed within the external housing 2 in such a position that the outlet unit 817 is positioned on the top surface 21 side and that the inlet unit 819 is positioned on the bottom surface 22 side. In this condition, the cooling liquid flows into and out of the heat exchanger 81 in the direction along the projection direction R.

Thus, even when the projector 1 is installed in various positions, bubbles accumulate only in the area up to approximately the half of the inside space of the second concave portion 812 at the most. Therefore, spread of the bubbles over the substantially entire area of the interior of the second concave portion 812 is prevented.

Accordingly, even when the projector 1 is installed in various positions, stable heat exchange efficiency between the cooling liquid and the heat exchanger 81 is maintained. Thus, the temperature of the cooling liquid can be efficiently lowered, and the cooling target to be cooled by the cooling liquid can be effectively cooled.

The heat absorbing surface 831 of the Peltier element 83 is connected with the approximately center of the plate surface of the exchanger main body 81A such that heat can be transmitted thereto. When bubbles accumulate in the space up to approximately the half of the inside of the second concave portion 812 at the most, a part of the heat transmission path between the heat absorbing surface 831 and the cooling liquid via the heat exchanger 81 is blocked by the accumulated bubbles. However, the other area of the heat transmission path between the heat absorbing surface 831 and the cooling liquid via the heat exchanger 81 is maintained.

Thus, even when bubbles accumulate in the space up to approximately the half of the inside of the second concave portion 812 at the most, the cooling liquid can be sufficiently cooled through the maintained heat transmission path.

Furthermore, the inlet unit 819 and the outlet unit 817 extend substantially parallel with the projection direction R. Thus, the connected liquid circulating members 9 do not project toward the top surface side 21 or the bottom surface side 22 from the heat exchanger 81. In this case, the thickness of the projector 1 (the length between the top surface 21 and the bottom surface 22) need not be increased considering the connection of the liquid circulating members 9 to the heat exchanger 81, and thus the thickness of the projector 1 can be reduced.

According to the first embodiment, the three positions of the normal position (the suspension position), the upward projection position, and the downward projection position have been discussed as examples of the positions of the projector 1 for simplifying the explanation. However, the projector 1 can be positioned with inclination in the range between the normal position and the upward projection position and between the normal position and the downward projection position, and the same advantages can be provided in these positions.

Second Embodiment

A second embodiment according to the invention is now described with reference to the drawings.

In the following explanation, the same reference numbers are given to structures and parts similar to those in the first embodiment, and the same detailed explanation is not repeated or is simplified.

Figure 10:
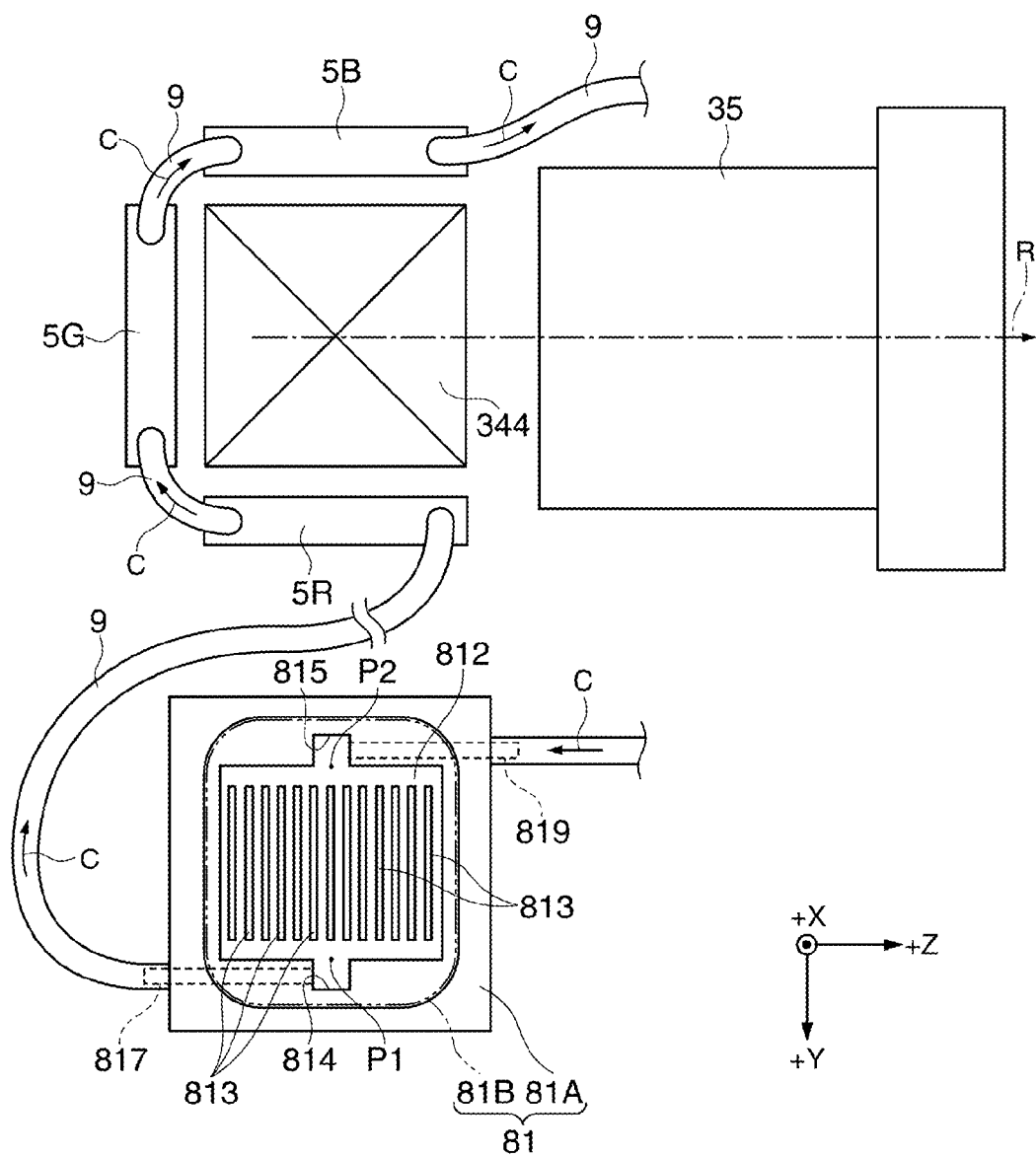
FIG. 10 schematically shows the positional relationship between a projection lens and a heat exchanger according to a second embodiment.

FIG. 10 schematically illustrates the positional relationship between the projection lens 35 and the heat exchanger 81 in the second embodiment. More specifically, FIG. 10 shows the projection lens 35 and the heat exchanger 81 as viewed from the top surface 21.

As illustrated in FIG. 10, this embodiment is different from the first embodiment only in the position of the heat exchanger 81.

More specifically, as illustrated in FIG. 10, the heat exchanger 81 is disposed within the external housing 2 such that the shielding plate 81B (+X axis side) faces the top surface 21, and that the +Z axis direction corresponds to the projection direction R.

That is, the heat exchanger 81 is positioned within the external housing 2 such that the heights of the inlet unit 819 and the outlet unit 817 from the bottom surface 22 become substantially the same, and that cooling liquid flows in and out substantially in parallel with the projection direction R.

The positions of the heat exchanger 81 when the projector 1 is installed in the respective positions in this embodiment are now explained.

Figure 11A:
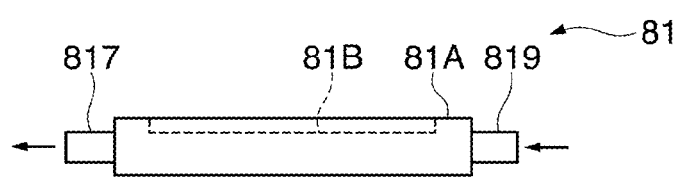
FIGS. 11A through 11C illustrate the positions of the heat exchanger corresponding to the various positions of a projector according to the second embodiment.
Figure 11B:
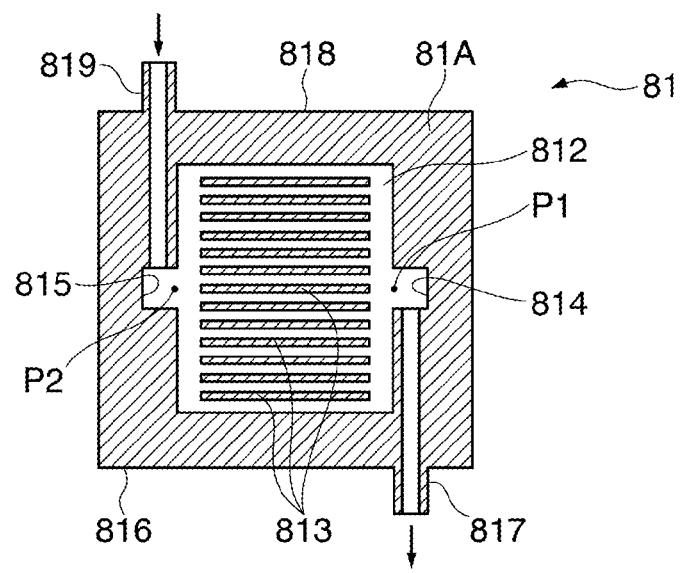
Figure 11C:
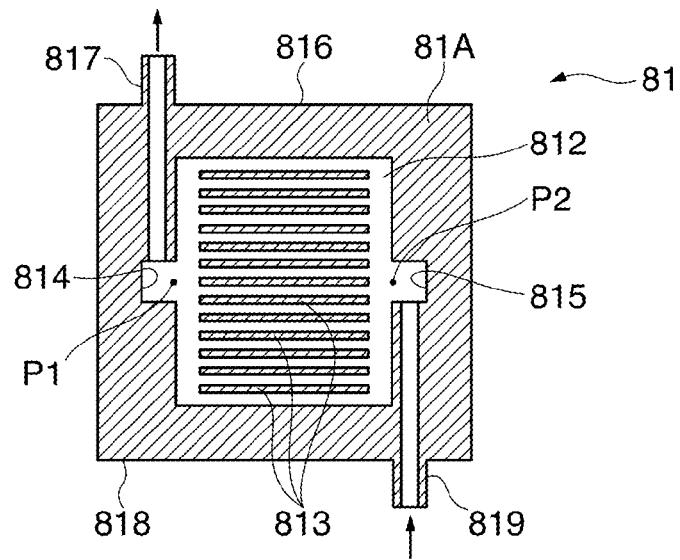

FIGS. 11A through 11C show the positions of the heat exchanger 81 when the projector 1 is installed in the respective positions.

In FIGS. 11A through 11C, the heat exchanger 81 is viewed from the +Y axis side (FIG. 11A) and from the shielding plate 81B side (FIGS. 11B and 11C) for simplifying the explanation.

When the projector 1 is installed in the normal position shown in FIG. 8A (this position applies to the suspension position), the shielding plate 81B is positioned on the upper side, and the thickness direction (X axis direction) corresponds to the up-down direction.

In this embodiment, the thickness of the heat exchanger 81 is smaller than the lengths in other directions (Y axis and Z axis directions). In this case, the clearance between the shielding plate 81B and a hole 817A of the outlet unit 817 (FIG. 6) is extremely small.

Thus, bubbles flowing into the second concave portion 812 through the inlet unit 819 shift upward by buoyancy and sequentially accumulate in the space on the shielding plate 81B side (upward) inside the second concave portion 812. However, these bubbles accumulate only in the space of the extremely small clearance discussed above, and the bubbles having reached the hole 817A of the outlet unit 817 are discharged with the cooling liquid through the outlet unit 817 to the outside.

When the projector 1 is installed in the upward projection position shown in FIG. 8B or the downward projection position shown in FIG. 8C, the exit side concave portion 814 and the entrance side concave portion 815 are positioned approximately at the centers in the up-down direction as illustrated in FIG. 11B and FIG. 11C similarly to the first embodiment.

Accordingly, in the second embodiment described herein, the same advantages as those in the first embodiment can be provided even when the heat exchanger 81 is disposed in the manner described above.

The invention is not limited to the embodiments describe herein, but may be practiced otherwise without departing from the scope of the invention. As such, changes and modifications including the following modifications may be made.

In the respective positions of the projector 1, the heat exchanger 81 may be disposed within the external housing 2 in a manner different from the respective embodiments as long as the first center position P1 is not located lower than the second center position P2 in the respective positions.

The shape of the heat exchanger 81 is not limited to those shapes in the respective embodiments.

For example, while the heat exchanger 81 has a rectangular shape in the plan view in the embodiments, the heat exchanger 81 may have a circular shape in the plan view. Similarly, the second concave portion 812 may have a circular shape in the plan view.

In the respective embodiments, the cooling targets are the liquid crystal panels 341. However, the cooling targets may be the optical elements such as the light source devices 31A and 31B, the polarization converting element 323, the entrance side polarization plates 342, and the exit side polarization plates 343, a power source device for supplying power to the respective components provided inside the projector 1, a controller for controlling the liquid crystal panels 341 or the like.

The respective units 5 through 8 constituting the liquid-cooling device 4 may be disposed in an order other than the order of the units 5 through 8 described in the embodiments.

According to the embodiments, the three liquid crystal panels 341 are provided. However, the number of the liquid crystal panels 341 is not limited to three but may be one, two, four, or a larger number.

The light modulating elements may be transmission type or reflection type liquid crystal panels, or light modulating elements other than liquid crystal type such as a device including micromirrors.

In the embodiments, only the front type projector which projects images in the screen-viewing direction has been discussed. However, the invention is applicable to a rear type projector which projects images in the direction opposite to the screen-viewing direction.

The heat exchanger according to the invention can be applied to a liquid-cooling device included in a projector used for the purpose of presentation, home theater or the like.

The present application claim priority from Japanese Patent Application No. 2009-090845 filed on Apr. 3, 2009, which is hereby incorporated by reference in its entirety.

What is claimed is:

1. A heat exchanger exchanging heat with a cooling liquid, comprising:
    a concave portion being hollow;
    a plurality of partition walls disposed in the concave portion in parallel with one another along a width direction of the heat exchanger to form a plurality of small flow paths extending in a direction substantially perpendicular to the width direction; and
    an inlet unit configured to allow the cooling liquid to flow into the heat exchanger; and
    an outlet unit configured to allow the cooling liquid to flow out of the heat exchanger; wherein
    the inlet unit and the outlet unit extend in directions opposite to each other along the width direction,
    the cooling liquid exits a first center position of the heat exchanger to the outlet unit and enters a second center position of the heat exchanger from the inlet unit, and
    the first center position and the second center position are respectively located approximately at centers of opposite sides of the concave portion in the width direction.

2. A liquid-cooling device to cool a cooling target by the cooling liquid comprising:
    exchanger according to claim 1.

3. A projector comprising:
    the liquid-cooling device according to claim 2; and
    an external housing configured to form an external case and having a top surface side and a bottom surface side; wherein
    the heat exchanger is disposed within the external housing such that the outlet unit is positioned near the top surface side of the external housing and the inlet unit is positioned near the bottom surface side of the external housing, and the cooling liquid flows into and out of the heat exchanger in a direction substantially parallel with a projection direction of images from the projector.

4. A projector comprising:
    the liquid-cooling device according to claim 2; and
    an external housing configured to form an external case and having a top surface side and a bottom surface side; wherein
    the heat exchanger is disposed within the external housing such that heights of the inlet unit and the outlet unit from the bottom surface side of the external housing are substantially equal, and the cooling liquid flows into and out of the heat exchanger in a direction substantially parallel with a projection direction of images from the projector.

5. A projector comprising:
    the liquid-cooling device according to claim 2; and
    an external housing configured to form an external case, the heat exchanger being disposed within the external housing such that the outlet unit is not positioned at a side lower than the inlet unit in any projection direction of the projector.

6. The liquid-cooling device according to claim 2, wherein the cooling liquid exits the heat exchanger through the outlet unit and flows along an annular path to cool the cooling target, and returns to the heat exchanger through the inlet unit.

7. The heat exchanger according to claim 1, further comprising:
    an exit side concave portion formed in a side wall of the concave portion at the first center position; and an entrance side concave portion formed in the side wall of the concave portion at the second center position; wherein the cooling liquid exits from the exit side concave portion through the outlet unit and enters from the entrance side concave portion through the inlet unit.

8. The heat exchanger according to claim 7, wherein the thermal conductivity of the material forming the sectioning plate is equal to or less than 0.9 W/(m·K).

9. The heat exchanger according to claim 1, further comprising:

a thermoelectric converting element including a heat absorbing surface and a heat release surface, the heat absorbing surface connected to the heat exchanger so as to transfer the heat;

a heat-release-side heat transfer unit connected to the heat release surface so as to transfer the heat; and a sectioning plate disposed to separate the heat exchanger from the heat-release-side heat transfer unit, the sectioning plate containing an opening into which the thermoelectric converting element is fitted, and formed of a material having a low thermal conductivity.

10. A projector including a heat exchanger configured to exchange heat with a cooling liquid and an external housing configured to form an external case, comprising:

a concave portion being hollow;

a plurality of partition walls disposed in the concave portion in parallel with one another along a width direction of the heat exchanger to form a plurality of small flow paths;

an inlet unit configured to allow the cooling liquid to flow into the heat exchanger; and an outlet unit configured to allow the cooling liquid to flow out of the heat exchanger; wherein the cooling liquid exits the heat exchanger from a first center position through the outlet unit and enters the heat exchanger from a second center position through the inlet unit, the first center position and the second center position are respectively located approximately at a center of opposite sides of the concave portion in the width direction, and the heat exchanger is disposed within the external housing such that the outlet unit is not positioned at a side lower than the inlet unit in any projection position.

* * * * *